United States Patent
Légaré et al.

(10) Patent No.: US 9,617,916 B2
(45) Date of Patent: Apr. 11, 2017

(54) GAS TURBINE ENGINE WITH BEARING BUFFER AIR FLOW AND METHOD

(71) Applicant: PRATT & WHITNEY CANADA CORP., Longueuil (CA)

(72) Inventors: Pierre-Yves Légaré, Chambly (CA); Alessandro Ciampa, Montreal (CA); Michel Labbé, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 665 days.

(21) Appl. No.: 13/687,452

(22) Filed: Nov. 28, 2012

(65) Prior Publication Data
US 2014/0144154 A1    May 29, 2014

(51) Int. Cl.
| | |
|---|---|
| F02C 7/06 | (2006.01) |
| F01D 25/16 | (2006.01) |
| F01D 25/18 | (2006.01) |
| F01D 11/04 | (2006.01) |
| F02C 6/08 | (2006.01) |

(52) U.S. Cl.
CPC .............. *F02C 7/06* (2013.01); *F01D 11/04* (2013.01); *F01D 25/16* (2013.01); *F01D 25/183* (2013.01); *F02C 6/08* (2013.01)

(58) Field of Classification Search
CPC ...... F01D 25/16; F01D 25/162; F01D 25/183; F01D 25/22; F01D 11/02; F01D 11/04; F01D 11/06; F01D 9/065; F02C 7/06; F02C 7/28; F02C 6/08; F16J 15/002; F16J 15/004

USPC ........ 60/782, 785, 39.08; 415/111, 112, 176, 415/229–231, 168.1, 168.2
See application file for complete search history.

(56) References Cited

U.S. PATENT DOCUMENTS

| | | | |
|---|---|---|---|
| 2,749,087 A | 6/1956 | Blackman et al. | |
| 3,133,693 A * | 5/1964 | Holl ........................ | F01D 11/04 184/6.11 |
| 3,135,562 A * | 6/1964 | Davies ................. | F16C 33/6637 184/6.11 |
| 4,369,016 A | 1/1983 | Dennison | |
| 4,463,956 A * | 8/1984 | Malott ..................... | F01D 25/18 277/412 |
| 4,542,623 A * | 9/1985 | Hovan ................... | F01D 25/125 165/51 |
| 4,574,584 A | 3/1986 | Hovan | |
| 4,619,699 A | 10/1986 | Petkovic-Luton et al. | |

(Continued)

FOREIGN PATENT DOCUMENTS

| | | |
|---|---|---|
| GB | 2366842 | 3/2002 |
| WO | 2011129724 A1 | 10/2011 |
| WO | 2014060860 | 4/2014 |

*Primary Examiner* — Gerald L Sung
*Assistant Examiner* — Alain Chau
(74) *Attorney, Agent, or Firm* — Norton Rose Fulbright Canada LLP

(57) ABSTRACT

The gas turbine engine has a bleed air aperture formed in the radially outer wall upstream from the combustor and a bearing cavity formed within the radially inner wall, at least two bearing seals enclosing at least one bearing in the bearing cavity and separating the bearing cavity from associated buffer air entry points, an oil supply system including oil paths leading to each of the bearings; a buffer air supply system including buffer air paths leading to each of the entry points and a baffle partitioning one of the entry points.

19 Claims, 3 Drawing Sheets

(56) References Cited

U.S. PATENT DOCUMENTS

| | | | |
|---|---|---|---|
| 4,645,415 A * | 2/1987 | Hovan | F01D 25/125 415/115 |
| 4,709,545 A * | 12/1987 | Stevens | F01D 11/00 60/39.08 |
| 5,619,850 A * | 4/1997 | Palmer | F01D 11/04 60/39.83 |
| 5,740,674 A | 4/1998 | Beutin et al. | |
| 6,330,790 B1 * | 12/2001 | Arora | F01D 11/04 277/303 |
| 6,470,666 B1 | 10/2002 | Przytulski et al. | |
| 6,516,618 B1 | 2/2003 | Bock | |
| 6,966,191 B2 | 11/2005 | Fukutani | |
| 7,377,110 B2 | 5/2008 | Sheridan et al. | |
| 7,568,843 B2 * | 8/2009 | Lefebvre | F01D 25/162 184/6.11 |
| 7,797,922 B2 | 9/2010 | Eleftheriou et al. | |
| 8,366,382 B1 | 2/2013 | Muldoon et al. | |
| 8,529,200 B2 | 9/2013 | Pakkala et al. | |
| 9,022,390 B2 | 5/2015 | Amador | |
| 2005/0235651 A1 | 10/2005 | Morris | |
| 2005/0244272 A1 | 11/2005 | Bruno | |
| 2007/0258669 A1 | 11/2007 | Lee | |
| 2008/0056890 A1 | 3/2008 | Ivakitch | |
| 2008/0066444 A1 | 3/2008 | Cornelius | |
| 2009/0238678 A1 | 9/2009 | Nyamu | |
| 2009/0297083 A1 | 12/2009 | Raberin | |
| 2011/0079019 A1 | 4/2011 | Durocher | |
| 2011/0173990 A1 | 7/2011 | Thies | |
| 2013/0039739 A1 | 2/2013 | Milne et al. | |
| 2014/0144121 A1 | 5/2014 | Legare et al. | |
| 2014/0271118 A1 | 9/2014 | Junod | |

* cited by examiner

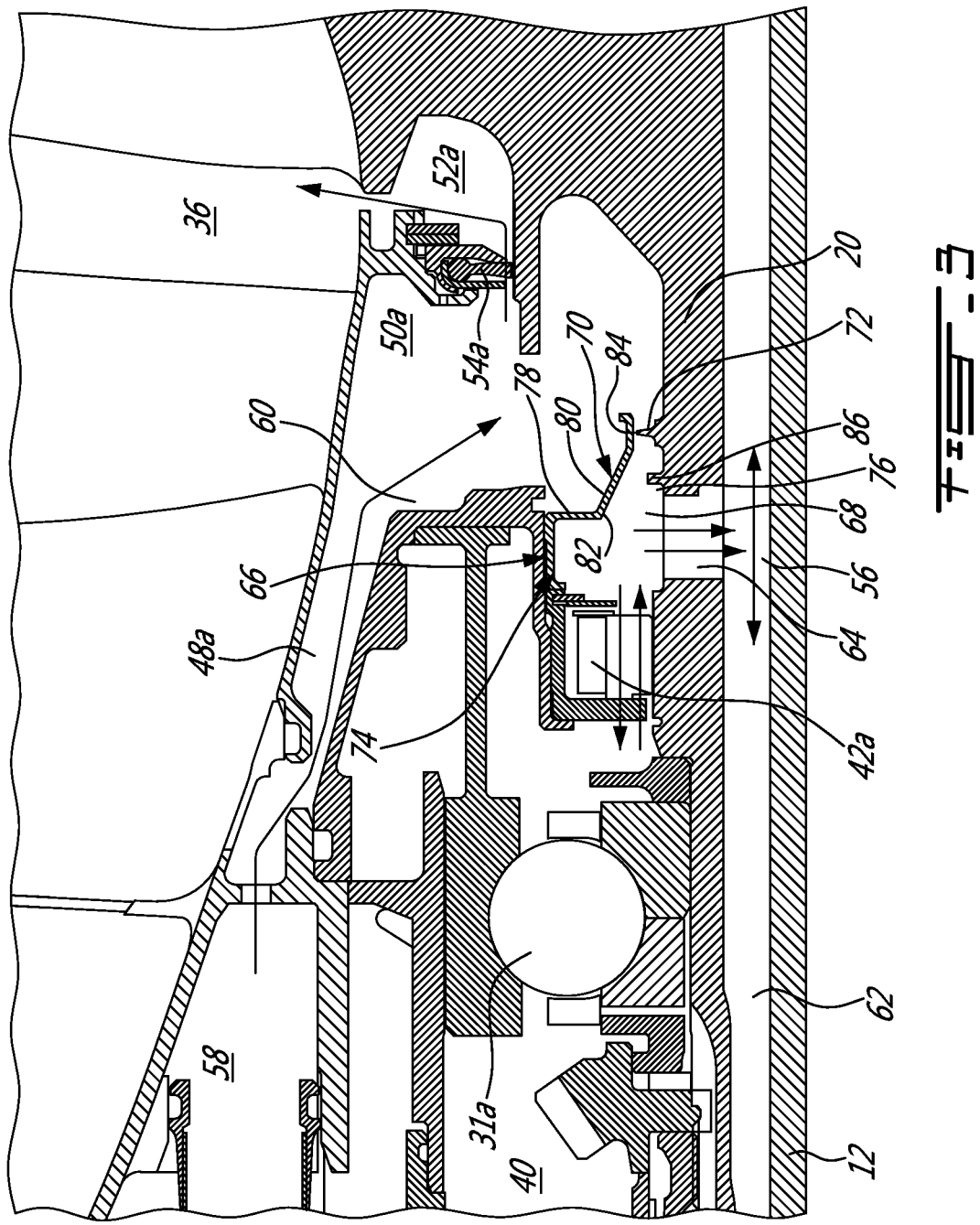

GAS TURBINE ENGINE WITH BEARING BUFFER AIR FLOW AND METHOD

TECHNICAL FIELD

The application relates generally to shaft bearing systems of gas turbine engines and, more particularly, to controlling oil leakage.

BACKGROUND

Buffer air flow reversal has been known to occur in some engine transcient conditions and can be related to bearing seal wear. During flow reversal, bearing oil which is normally retained into the bearing cavity by the greater buffer air pressure at the entry point, becomes instead entrained away from the bearing cavity by the bearing cavity pressure being higher than the buffer air pressure at the entry point. If a path is present between the entry point and the gas path, upstream of a bleed air feed for cabin pressurization, oil contaminated air can potentially make its way into the cabin which is undesired. Accordingly, there remains room for improvement in addressing bearing buffer air flow reversal in gas turbine engines.

SUMMARY

There is provided a gas turbine engine having an annular gas path between a radially outer wall and a radially inner wall, leading successively across at least one compressor stage, a combustor section, and at least one turbine stage; a bleed air aperture in the radially outer wall upstream from the combustor; a bearing cavity formed within the radially inner wall, having at least one bearing therein rotatably supporting at least one shaft of the gas turbine engine, at least two bearing seals enclosing the at least one bearing in the bearing cavity and separating the bearing cavity from associated buffer air entry points, and at least one scavenge passage inlet in the bearing cavity; an oil supply system including at least one oil path leading to the at least one bearing; a buffer air supply system including at least one buffer air path leading to the entry points; a baffle extending across one of said entry points and partitioning two portions of said one of said entry points, a first portion of said two portions communicating with the buffer air path and a secondary path, the secondary path being provided with a flow restrictor and leading to a portion of the gas path upstream of the bleed air aperture, a second portion of said two portions forming a subchamber portion in which is provided an associated one of said bearing seal, the subchamber portion communicating with a deviation path leading to a deviation outlet separate from the portion of the gas path upstream of the bleed air aperture; the deviation path having a flow restriction both: sufficiently high to collaborate with the secondary path flow restrictor, the corresponding bearing seal and buffer air supply system in establishing a positive buffer air flow across the baffle during positive flow conditions across the bearing seal toward the associated bearing, and sufficiently low to maintain the positive buffer air flow across the baffle upon reversed flow conditions across the bearing seal toward the entry point.

There is also provided a gas turbine engine having an annular gas path between a radially outer wall and a radially inner wall and leading successively across at least one compressor stage, a combustor section, and at least one turbine stage; a bleed air aperture in the radially outer wall upstream from the combustor; a bearing cavity formed within the radially inner wall to the gas path, having at least one bearing therein rotatably supporting at least one shaft of the gas turbine engine, at least two bearing seals enclosing the at least one bearing in the bearing cavity and separating the bearing cavity from associated buffer air entry points, and at least one scavenge passage inlet in the bearing cavity; an oil supply system including at least one oil path leading to the bearings; at least a first one of said buffer air entry points having a first flow rate specification, said at least first one being in fluid flow communication with an associated secondary path leading to a portion of the gas path upstream of the bleed air aperture, said at least first one communicating with a first buffer air path adapted to said first flow rate specification, said at least first one being provided with associated flow restrictors, including the corresponding bearing seal, said flow restrictors collaborating with the first buffer air path in maintaining a first pressure to favour positive flow conditions across the corresponding bearing seal, into the bearing cavity; at least a second one of said buffer air entry points having a second flow rate specification, said at least second one being in fluid flow communication with a deviation path being partitioned from the portion of the gas path upstream of the bleed air aperture, said at least second one of said buffer air entry points communicating with a second buffer air path adapted to said second flow rate specification, the at least second one being provided with associated flow restrictors, including the corresponding bearing seal, the flow restrictors collaborating with the second buffer air path in maintaining a second pressure to favour positive flow conditions across the corresponding bearing seal, into the bearing cavity, the second pressure being lower than the first pressure.

There is further provided a method of providing buffer air to bearings rotatably holding a shaft in a gas turbine engine having an annular gas path between a radially outer wall and a radially inner wall and leading successively across at least one compressor stage, a combustor section, and at least one turbine stage, and at least one hollow strut extending across the gas path upstream of the combustor section, the method including: channelling the buffer air across the gas path using the strut thereby exposing the buffer air to thermal contact with the gas path across a wall of the strut and cooling the buffer air.

DESCRIPTION OF THE DRAWINGS

Reference is now made to the accompanying figures, in which:

FIG. 3 is a portion of FIG. 2 enlarged, showing an entry point of buffer air to one of the bearings.

DETAILED DESCRIPTION

Figure 1:
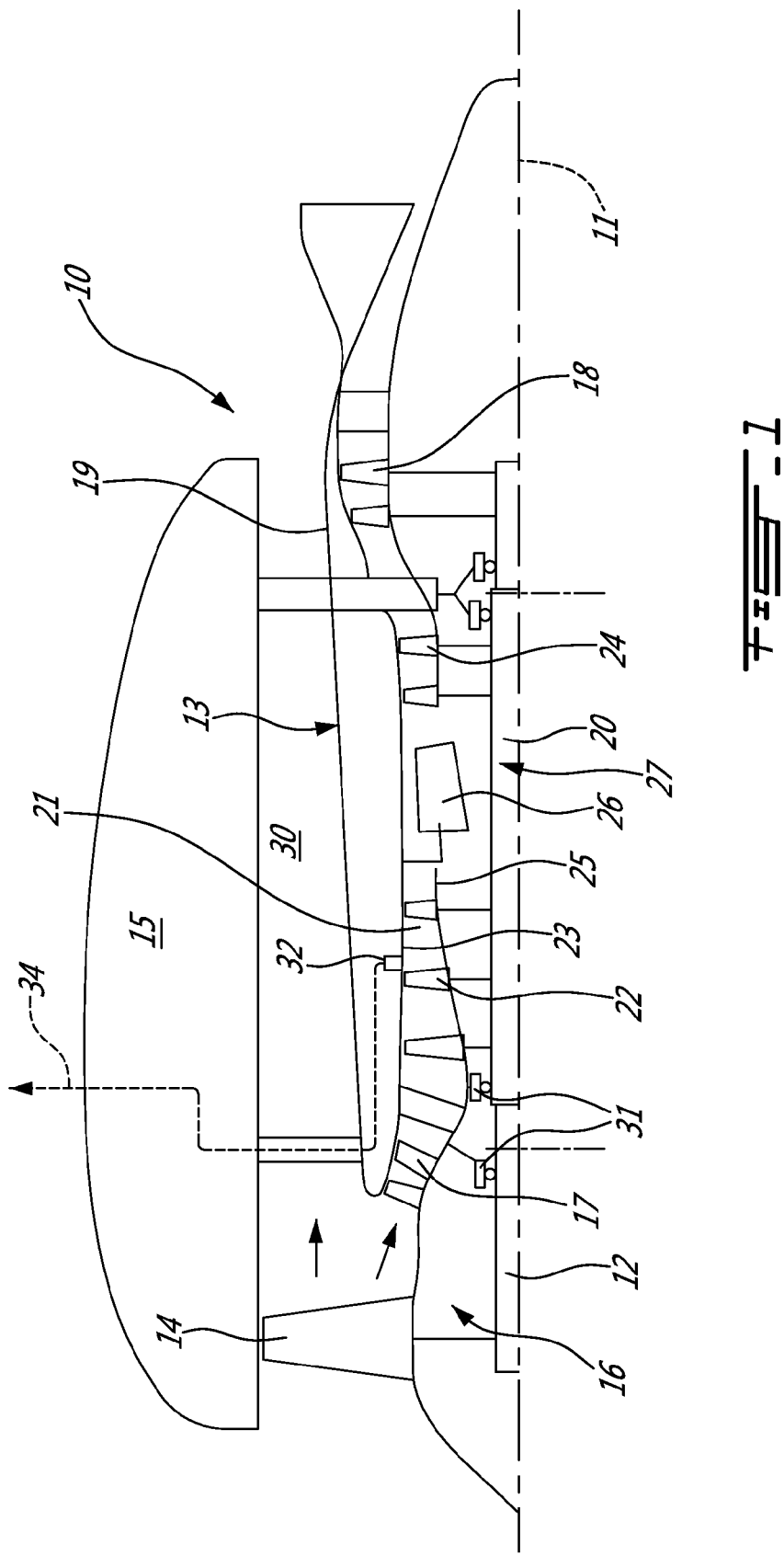
FIG. 1 is a schematic cross-sectional view of a gas turbine engine.

FIG. 1 shows an example of a turbofan gas turbine engine 10 which includes an annular bypass duct 15 housing an engine core 13. The engine core 13 is coaxially positioned within the annular bypass duct 15 and an annular bypass air passage 30 is defined radially therebetween for directing a bypass air flow driven by a fan assembly 14.

The engine core 13 has a non-rotary portion referred to herein as the core casing 19 which rotatably accomodates a low pressure spool assembly 16 which includes the fan assembly 14, a low pressure compressor assembly 17 for a first compressor stage, and a low pressure turbine assembly 18 for a second turbine stage, all interconnected by a first, inner shaft 12, and a high pressure spool assembly 27 which includes a high pressure compressor assembly 22 for a second compressor stage and a high pressure turbine assembly 24 for a first turbine stage, both interconnected by a second, outer shaft 20. The spools 16, 27, can independently rotate about a central axis 11 of the engine via their associated shafts 12, 20.

A gas path 21 is formed in the engine core 13. The gas path 21 splits from the bypass air passage 30 downstream of the fan 14 and channels a main flow sequentially through the compressor stages 17, 22 for pressurizing the air, a combustor 26 in which the compressed air is mixed with fuel and ignited for generating an annular stream of hot combustion gases, and turbine stages 24, 18 where energy is extracted from the combustion gases. The gas path 21 is formed between a radially-outer wall 23 and a radially-inner wall 25. The radially-outer wall 23 is formed in the core casing 19, whereas the radially-inner wall 25 is made continuous along the compressor and turbine stages both by non-rotating portions of the core casing 19 rotary portions of the spools 16, 27.

At least one bleed air aperture 32 is formed in the radially-outer wall 23 of the gas path 21, upstream of the combustor 26, in the compressor stages 17, 22, to obtain pressurized air which can be carried along a bleed air path 34 and at least a portion of which can be used for pressurizing a cabin of the aircraft.

The rotating spool assemblies 16, 27, and more specifically the shafts 12, 20 thereof, are rotatably received in the non-rotating core casing 19 via bearings 31, two or more of which are on the inlet side and some of which are on the exhaust side relative the combustor 26.

Figure 2:
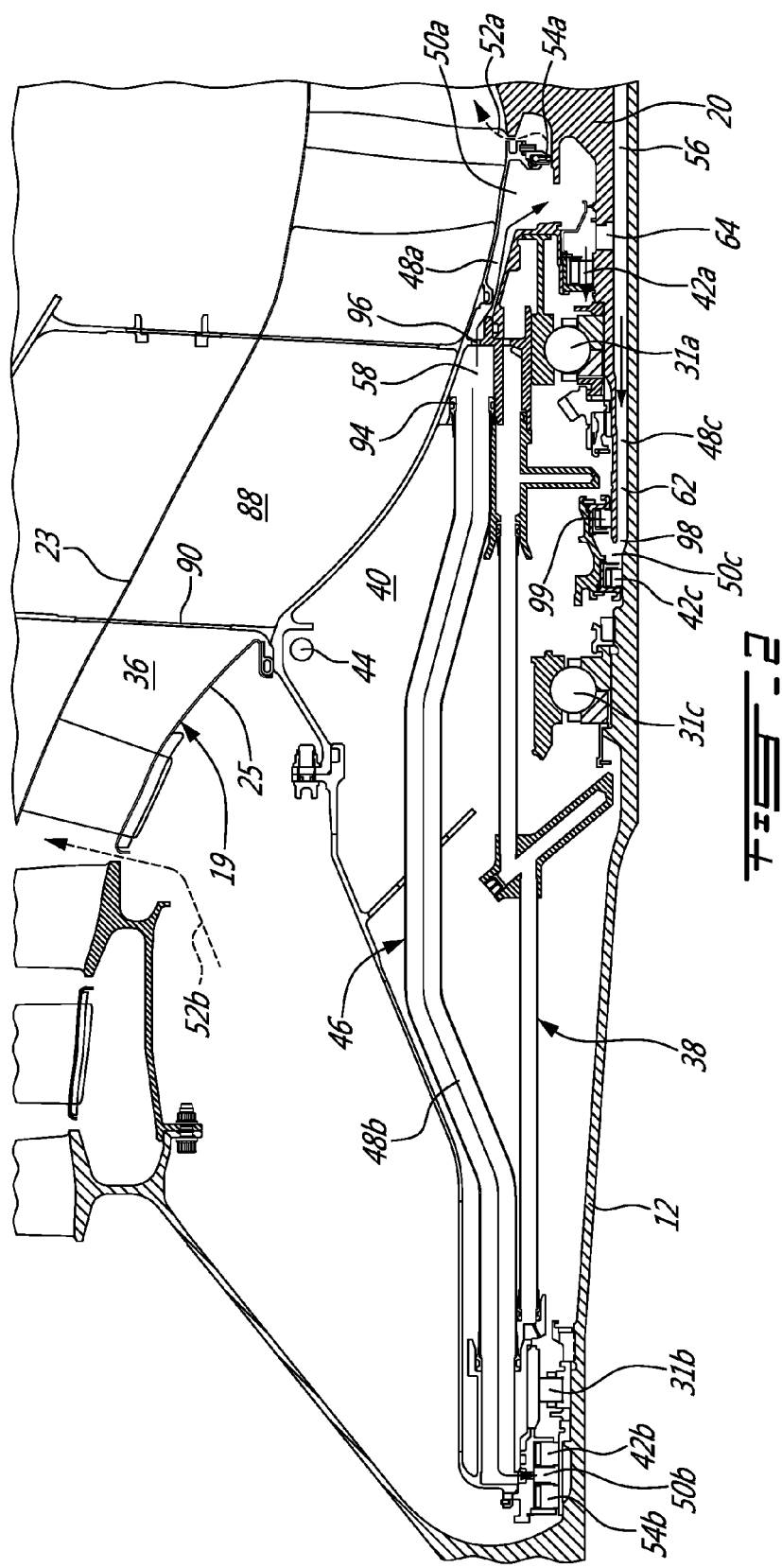
FIG. 2 is a portion of FIG. 1 enlarged, showing a portion of the gas path upstream from a bleed aperture and combustor.

Referring to FIG. 2, which shows bearings 31a, 31b, 31c of the inlet side and a portion of the gas path 36 upstream of the bleed aperture, it can be seen that in this particular embodiment, the gas turbine engine 10 has three bearings 31a, 31b, 31c rotatably receiving the inner shaft 12 and outer shaft 20 in a non-rotating portion of the core casing 19. Each one of the bearings 31a, 31b, 31c is continuously supplied with oil for lubrication and cooling. The oil is supplied by an oil supply system 38 which includes oil paths which can be formed by an oil tubing network branching off to each bearing 31a, 31b, 31c. In operation, used oil thus continuously spills from the bearings 31a, 31b, 31c as fresh oil is being fed.

A bearing cavity 40 is formed in the non-rotary portion of the core casing 19, within the radially-inner wall 25 of the gas path portion 36. The bearing cavity contains the bearings 31a, 31b, 31c. Gaps between the walls and/or structure of the bearing cavity 40 and the rotary shafts 12, 20 are sealed via corresponding bearing seals 42a, 42b, 42c associated to corresponding bearings 31a, 31b, 31c. A scavenge passage inlet 44 is provided in the bearing cavity 40, leading to a scavenge passage by which used oil can be removed from the bearing cavity.

A positive pressure system is set up in order to direct the used oil into the bearing cavity 40 from where it can be evacuated by the scavenge passage. The positive pressure system includes a buffer air supply system 46 having buffer air paths 48a, 48b, 48c supplying pressurized air to entry points 50a, 50b, 50c associated with each bearing 31a, 31b, 31c, and a relative flow rate control system which, in this case, includes a plurality of flow restrictors. In this description, the expression flow restrictor implies a structure which restricts the flow rate and therefore causes a pressure differential. In a single component, a flow restrictor can be provided in the form of an aperture of a controlled size, whereas between a rotary and a fixed component, flow restrictors are provided in the form of seals. Alternately, flow rate control can be embodied using additional air pressure sources for instance. Generally, the positive pressure system maintains air pressure at the entry points 50a, 50b, 50c, higher than the maximum pressure expected in the bearing cavity 40, and unless flow rate of pressurized air is specifically useful at a specific location, flow restrictors in the form of seals maintain the flow rate at a minimum. Various types of seals exist in the art, and an engine developer can select a seal of a satisfactory type depending on a flow rate specification for the seal.

In this embodiment, the entry points 50a, 50b, 50c are in the form of cavities which are distinct and separated from the bearing cavity 40 and the corresponding bearings 31a, 31b, 31c by associated bearing seals 42a, 42b, 42c. Some of the entry points 50a, 50b are associated with secondary paths 52a, 52b leading to the gas path portion 36 which is upstream of the bleed air aperture, in which case the corresponding entry points 50a, 50b are separated from the secondary paths 52a, 52b by associated secondary seals 54a, 54b. During normal use, the pressure of the buffer air is higher than the pressure in the bearing cavity 40 and therefore, the pressure at the entry points 50a, 50b, 50c can be maintained higher than the pressure in the cavity 40, in which case relatively small flow of buffer air travels across the bearing seals 42a, 42b, 42c, and then across the bearings 31a, 31b, 31c carrying with it used oil into the bearing cavity 40 and preventing the used oil from escaping into the entry points.

To this end, the buffer air paths 48a, 48b, 48c, are designed to allow a sufficient flow rate of air to satisfy the flow rate specifications of the associated entry points 50a, 50b, 50c.

In this embodiment, buffer air paths 48a and 48c are in series, with entry point 50a therebetween. Furthermore, entry point 50a is in fluid flow communication with a deviation path 56 which is partitioned from the gas path portion 36 upstream of the bleed air aperture. Henceforth, the flow rate specification of entry point 50a include not only the flow rate expected through its associated seals 42a, 54a, but also the flow rate which can be expected through the entry point 50c and the deviation path 56. As will be detailed below, a significant flow rate is associated with the deviation path 56. The positive pressure system can work well without further features during normal use, as long as the buffer air pressure at the entry points 50a, 50b, 50c remains higher than the internal pressure of the bearing cavity 40.

However, some flight situations, such as transient conditions, can lead to pressure variations in the buffer air supply. Further, wear of the seals can affect the flow rate which travels thereacross for a given pressure differential. In turn, in the event of wear of one or more of the seals 42a, 42b, 42c can cause a greater flow rate of buffer air into the bearing cavity and increase the pressure in the bearing cavity. If the buffer air pressure at any given entry point 50a, 50b, 50c becomes lower than the internal bearing cavity pressure, flow reversal across the associated bearing seal 42a, 42b, 42c occurs. During reversed flow, pressurized air from the bearing cavity 40 flows across the bearings 31a, 31b, 31c and associated bearing seals 42a, 42b, 42c into the entry point 50a, 50b, 50c, contaminated with used oil, and could eventually enter the secondary path 52b, 52a leading to the gas path portion 36. The bleed air could thus become contaminated with oil and be used in the cabin, and even a very minor oil contamination in the cabin air can render the cabin atmosphere very uncomfortable for any passengers—a highly undesirable scenario. This description presents examples of means by which the likelihood of oil contamination in the gas path portion 36 upstream of the bleed air aperture can be reduced.

FIG. 3 shows the area of bearing 31a enlarged. An associated buffer air path 48a is formed between a plenum 58 leading to an associated entry point 50a. The entry point 50a is in the form of a cavity exposed to the associated bearing seal 42a, having an inlet 60 receiving the associated buffer air path 48a, being in fluid flow communication with the secondary path 52a via a secondary seal 54a, and being in fluid flow communication with a deviation path 56, provided in this example by way of the intershaft spacing 62, via an intershaft feed orifice 64. The pressure of the entry point 50a is controlled to favour remaining higher than the pressure in the bearing cavity 40. In this embodiment, for instance, a secondary seal 54a limits the flow rate into the gas path to a practical minimum, and seals 42a, 42c and 99 limit the flow rate into the bearing cavity to a practical minimum. In alternate embodiments, the flow rate specifications can be higher for a specific seal in order to provide a source of pressurized air for a given purpose. The deviation path 56 is in fluid flow communication with the atmosphere and/or exhaust gasses at the rear of the engine in this case, and the flow rate is also controlled at that point (not shown), which can be done by an appropriate form of deviation path flow restrictor, for instance. The associated buffer air path 48a and plenum 58 are designed to supply a flow rate quantity of buffer air to satisfy the flow rate specifications of all the afore-mentioned seals 54a, 42a, 42c, 99, and the flow rate specifications of the deviation path flow restrictor.

In the illustrated embodiment, the presence of the intershaft feed orifice 64 leading to the intershaft spacing 62 in this example provides an alternate route referred to as a deviation path 56 to evacuate oil should oil flow reversal occur at the bearing seal 42a. As a guide to this end, a baffle 66 is used to partition a subchamber 68 from the remaining portion of the entry point 50a. In the event of flow reversal at bearing seal 42a, fluid flow will travel across the intershaft feed orifice 64 rather than across the baffle 66, as long as the total flow rate evacuated by that route is greater than the reversed flow rate through bearing seal 42a, plus the flow rate in buffer air path 48a, minus the flow rate through secondary seal 54a. More particularly, if flow is not reversed through seals 42c nor 99, the total flow rate evacuated through intershaft feed orifice 64 is the sum of the flow rate fed into the bearing cavity through seals 42c and 99, and the flow rate evacuated at the rear of the engine. If the flow is also reversed at seals 42c and 99, the total flow rate evacuated through the intershaft feed orifice 64 is equal to the flow rate evacuated at the rear of the engine minus the reversed flow rate through seals 42c and 99. I In this embodiment, the baffle 66 partitions the subchamber 68, where the associated bearing seal 42a and intershaft feed orifice 64 are located, from the remainder of the entry point 50a where the seal 54a leading to the secondary path 52a is located. It will be noted here that the baffle is intended to allow positive flow rate therethrough in the direction of the bearing seals 42a and 42b and therefore presents a flow restriction which is preferably kept to a practical minimum, and therefore rather acts as a splash guard than a seal. The desired pressure and flow rate conditions can be controlled to ensure that the flow rate across the intershaft feed orifice is always positive, toward the deviation path 56, which can be done simply by designing the deviation path with a sufficiently low amount of flow restriction and by providing a sufficient amount of buffer air. Henceforth, upon flow restriction, the reversed flow through bearing 31a is forced across the intershaft feed orifice 64 into the intershaft spacing 62 and the baffle 66 prevents potentially splashing oil from exiting the subchamber otherwise than through the intershaft feed orifice 64. Henceforth, oil-contaminated fluid is guided away from the secondary path 52a and prevented from entering the gas path 36.

In this embodiment, the baffle 66 includes a non-rotating baffle 70 and a seal 72 formed in the rotary outer shaft 20 and oriented in opposition with the non-rotating baffle 70. In this embodiment, a fin labyrinth seal was selected given its low price and satisfactory performance in the context of its intended use as detailed above. In alternate embodiments, other seal types like carbon seal or brush seal can be used. Alternately, the fin can be part of the baffle oriented down toward the shaft (axial baffle portion 84 not needed), although this was not retained in the illustrated embodiment for assembly reasons. Henceforth, in the event of flow reversal at the bearing seal 42a, a high velocity positive flow into the subchamber 68 from the remaining portion of the entry point 50a can be maintained across the lab seal 72, and the reversed flow is thus guided into the intershaft spacing 62 where the pressure is lower still, through the intershaft feed orifice 64. This can thus successfully prevent oil from reaching the gas path portion 36 upstream from the bleed air aperture in such an event of flow reversal.

In this particular embodiment, opposing outer gutter 74 and inner gutter 76 are further formed respectively by the baffle 70 and the outer shaft 20. More particularly, on the one hand, an annular outer gutter 74 shape is formed in the baffle 70 and has a radially-extending portion 78 connected to an adjacent sloping portion 80 by a corner 82, the sloping portion 80 leading to an axially oriented portion 84 positioned in opposition with the lab seal 72, and on the other hand, an annular inner gutter 76 shape is further formed in the outer shaft 20, partially by way of an outward annular projection 86 formed in the outer shaft 20 adjacent the lab seal 72, the outward annular projection 86 being radially aligned with the sloping portion 80 of the baffle 70. The opposing gutters 74, 76 serve to guide the oil during engine shutdown, preventing the oil from reaching the lab seal 72, from where it could potentially exit the subchamber 68 at the next startup. More particularly, in the upper portion of the engine, when the engine axis is horizontal, oil adhering to the outer gutter 74 can drip off the corner 82 and fall in the inner gutter 76. Moreover, in the lower portion of the engine, oil in the inner gutter 76 can drip off the outward annular projection 86 and fall onto the sloping portion 80 of the baffle 70 which then slopes downwardly away from the lab seal 72, into the outer gutter 74. The external annular projection 86 can also serve as a splash guard to prevent splash from reaching the lab seal 72, such as in the event of oil dripping from the corner 82 of the baffle or flow reversal across seal 42a.

Since a deviation path 56 is available at bearing 31a, as detailed above, and that means can be provided to guide oil to the deviation path 56 such as presented above, the issue of potential oil flow reversal through seal 42a at that bearing location can be satisfactorily addressed. However, on a given engine, not all bearing locations offer a deviation path to avoid the gas path portion 36 upstream of the bleed air aperture, and even if all bearing locations do offer a deviation path, it may be preferred to provide any required means to guide the reverse flow to the deviation path only at one or some of the bearing locations, such as for weight or cost considerations for instance. For example, in the embodiment shown in FIG. 2, the entry point 50b to bearing 31b has no deviation path, and pressure reversal there cannot be dealt with in the same manner as it is dealt with for bearing 31a.

However, the pressure at the entry points 50a, 50b, 50c can be independently controlled to favour occurrences of flow reversal at a selected one of the entry points 50a, 50b, 50c. For instance, the buffer air supply system 46 can be configured to maintain a higher pressure at a first entry point than to at a second entry point, in a manner that if flow reversal occurs following a given buffer air pressure loss event, it can occur at the second entry point without occurring at the first. In this manner, the system can be configured for a flow reversal to preferably occur at an entry point where means are provided to deal with it and guide it to a deviation path avoiding the gas path portion 36 upstream from the bleed air aperture.

Referring to FIG. 2, in this specific example, hollow struts 88 extending across the gas path portion 36 which are closed by a contour wall 90 except for an inlet at the outer end and an outlet 94 at the inner end, are used as a ducts for channelling buffer air across the gas path portion 36 during which the buffer air can loose heat to the gas path portion 36. Such a system is optional, but can be advantageous to potentially reduce cooling requirements in some embodiments. The outlets 94 of two or more struts 88 can be interconnected by a plenum 58 to offer a balanced pressure. The buffer air path then splits into one buffer air path 48b leading to the entry point 50b and another air path 48a leading to the entry point 50a.

In this specific embodiment, the buffer air flow to entry point 50a is restricted compared to the buffer air flow to entry point 50b by way of a flow restrictor 96 such as a smaller apertured area for instance. The degree of flow restriction is selected to control the amount of flow therethrough depending on the flow specifications downstream thereof (e.g. sum of the expected flow leaks). Therefore, flow of buffer air is favored to entry point 50b. Compared to one another, entry point 50b can be said to be a low pressure entry point and entry point 50a can be said to be a high pressure entry point. For a given pressure loss in the struts 88 and/or at the plenum 58, a flow reversal could thus occur at entry point 50a where the pressure is lesser and where it can be dealt with to avoid contamination of cabin air, without occurring at entry point 50b where the pressure is higher, assuming that the pressure across the bearing cavity 40 is constant. It will be understood that in alternate embodiments, a similar relative flow restriction can be achieved by adding buffer air flow at a high pressure entry point using an additional buffer air path, or by using independent, and flow-rate adapted buffer air paths for the high pressure and low pressure entry points rather than by restricting flow in the low pressure buffer air path downstream a common plenum as presented above. Furthermore, it will be understood that in this embodiment, flow is controlled upstream of the low pressure entry point because the disclosed embodiment does not provide for any use of buffer air other than maintaining pressure in the first and second entry point. Henceforth, increasing the pressure further downstream would only increase the amount of pressure differential at the upstream seals and therefore cause a waste of pressurized air. In alternate embodiments, if buffer air is used downstream of the associated buffer air path, the flow restriction can be located downstream of that use. For instance, the baffle seal can be used as a flow restrictor if a use of buffer air downstream of the secondary seal 54a is intended.

Still referring to FIG. 2, it will be noted that in an embodiment such as the one illustrated having two shafts 12, 20 and an intershaft spacing 62, a gap 98 can be present between the tip of the outer shaft 20 and the inner shaft 12. In this particular example, this gap 98 is sealed from the bearing cavity 40 by two seals, including bearing seal 42c leading to the bearing cavity 40 across bearing 31c, and a seal 99. The entry point 50c to both these seals is pressurized via the entry point 50a, along connecting path 48c extending along a portion of the intershaft spacing 62 from the intershaft feed orifice 64.

The location of this bearing 31c and associated bearing seal 42c is such that it has a natural deviation path into the intershaft spacing 62 via the gap 98. Furthermore, it does not have an independent secondary path leading to the gas path portion 36 upstream from the bleed aperture. Henceforth, bearing seal 42c can be a location of preferred flow reversal even over bearing seal 42a. In this particular embodiment, the buffer air supply system 46 is configured for pressure to be lower at entry point 50c than at entry point 50a, which is achieved by the use of a flow restrictor in the connecting path 48c, such as can be provided by a restricted area of intershaft feed orifice 64 for instance. In this sense, when compared to one another, entry point 50c can be said to be a low pressure entry point whereas entry point 50a can be said to be a high pressure entry point. Upon flow reversal at bearing seal 42c, oil-contaminated fluid can evacuate toward the aft of the engine via the intershaft spacing 62.

The above description is meant to be exemplary only, and one skilled in the art will recognize that changes may be made to the embodiments described without departing from the scope of the invention disclosed. For example, the teachings can be applied to gas turbine engine types other than turbofan engines. Alternate embodiments can be applied to gas turbine engines having a single shaft instead of two shafts, for instance in which case a deviation path can be provided in a single hollow shaft, for instance, and to bearing cavities having two bearings instead of three, for instance. Still other modifications which fall within the scope of the present invention will be apparent to those skilled in the art, in light of a review of this disclosure, and such modifications are intended to fall within the scope of the appended claims.

What is claimed is:

1. A gas turbine engine having an annular gas path between a radially outer wall and a radially inner wall, leading successively across at least one compressor stage, a combustor section, and at least one turbine stage, the gas turbine engine comprising:
   a bleed air aperture in the radially outer wall upstream from the combustor, the bleed air aperture drawing pressurized bleed air from the at least one compressor stage which is carried along a bleed air path, at least a portion of the pressurized bleed air being used for pressurizing an aircraft cabin;
   a bearing cavity formed within the radially inner wall, having at least one bearing therein rotatably supporting at least one shaft of the gas turbine engine, at least two bearing seals enclosing the at least one bearing in the bearing cavity and separating the bearing cavity from at least one buffer air entry point, and at least one scavenge passage inlet in the bearing cavity;
   an oil supply system including at least one oil path leading to the at least one bearing;

a buffer air supply system including at least one buffer air path leading to the at least one buffer air entry point; and a baffle extending across the at least one buffer air path and partitioning said buffer air path into first and second portions, the first portion being upstream of the second portion relative to normal flow through the at least one buffer air path during normal flow conditions of the gas turbine engine, the first portion communicating with the at least one buffer air entry point and a secondary path flowing to a portion of the gas path upstream of the bleed air aperture relative to normal flow through the gas path during normal flow conditions of the gas turbine engine, the secondary path being downstream of the baffle relative to the normal flow through the gas path during normal flow conditions of the gas turbine engine, a first flow restrictor being disposed within the secondary path, the second portion being exposed to one of the at least two bearing seals and communicating with a deviation path flowing to a deviation outlet separate from the portion of the gas path upstream of the bleed air aperture, the deviation path having a second flow restrictor sized to maintain flow from the first portion toward the second portion across the baffle and from the second portion toward the bearing cavity across the bearing seal during normal flow conditions of the gas turbine engine, said baffle guiding fluid within the second portion through the deviation path, upon flow reversal.

2. The gas turbine engine of claim 1 wherein the deviation path extends inside at least one of said at least one shaft.

3. The gas turbine engine of claim 2 wherein the gas turbine engine has two shafts, and the deviation path extends at least partially along an intershaft spacing between the two shafts.

4. The gas turbine engine of claim 2 wherein the baffle has a baffle member and a lab seal protruding outwardly from said at least one shaft.

5. The gas turbine engine of claim 1, wherein the second portion forms a subchamber portion, the subchamber portion includes an outer gutter.

6. The gas turbine engine of claim 5 wherein the outer gutter is formed at least partially by the baffle having a radially-extending section connected to an axially sloping portion by a corner.

7. The gas turbine engine of claim 1, wherein the second portion forms a subchamber portion, the subchamber portion includes an inner gutter formed in the at least one shaft.

8. The gas turbine engine of claim 7 wherein the inner gutter includes an annular outward protrusion formed in the at least one shaft.

9. The gas turbine engine of claim 8 wherein the annular outward protrusion is radially aligned with an axially sloping portion of a baffle member of the baffle, the baffle member at least partially forming an outer gutter.

10. The gas turbine engine of claim 9 wherein the baffle includes a seal extending between the at least one shaft and the baffle, the seal being positioned adjacent the annular outward protrusion.

11. A gas turbine engine having an annular gas path between a radially outer wall and a radially inner wall and leading successively across at least one compressor stage, a combustor section, and at least one turbine stage, the gas turbine engine comprising:

a bleed air aperture in the radially outer wall upstream from the combustor;

a bearing cavity formed within the radially inner wall to the gas path, having at least one bearing therein rotatably supporting at least one shaft of the gas turbine engine, at least two bearing seals enclosing the at least one bearing in the bearing cavity and separating the bearing cavity from a number of buffer air paths in communication with a plurality of buffer air entry points, and at least one scavenge passage inlet in the bearing cavity;

an oil supply system including at least one oil path leading to the bearings;

a first entry point of said plurality of buffer air entry points having a first flow rate specification value, said first entry point fluidly communicating with a first buffer air path and being in fluid flow communication with an associated secondary path leading to a portion of the gas path upstream of the bleed air aperture relative to flow along the gas path during normal flow conditions of the gas turbine engine, said first entry point communicating with the first buffer air path adapted to said first flow rate specification value, said first entry point being provided with a first plurality of flow restrictors disposed within the associated secondary path, including a first bearing seal of at least two bearing seals, said first plurality of flow restrictors collaborating with the first buffer air path in maintaining a first pressure to favour positive flow conditions across the first bearing seal of the at least two bearing seals, into the bearing cavity;

a second entry point of said plurality of buffer air entry points having a second flow rate specification value, said second entry point fluidly communicating with a second buffer air path and being in fluid flow communication with a deviation path being partitioned from the portion of the gas path upstream of the bleed air aperture, said second entry point of said plurality of buffer air entry points communicating with the second buffer air path adapted to said second flow rate specification value, the second entry point being provided with a second plurality of flow restrictors disposed within the deviation path, including a second bearing seal of the at least two bearing seals, the second plurality of flow restrictors collaborating with the second buffer air path in maintaining a second pressure to favour positive flow conditions across the second bearing seal of the at least two bearing seals, into the bearing cavity, the second pressure being lower than the first pressure, the second plurality of flow restrictors being sized to maintain positive flow conditions across the second bearing seal of the at least two bearing seals toward the bearing cavity; and a buffer air supply including a plenum branching off to the first buffer air path and the second buffer air path, said first buffer air path flowing from the plenum in an upstream direction relative to the flow along the gas path during normal flow conditions of the gas turbine engine, and said second buffer air path flowing from the plenum in a downstream direction relative to the flow along the gas path.

12. The gas turbine engine of claim 11, comprising a flow restrictor formed in the second buffer air path, the flow restrictor throttling the flow rate of buffer air at the second entry point, thereby establishing the higher relative pressure at the first entry point.

13. The gas turbine engine of claim 11, wherein the second entry point is further in fluid flow communication both with an associated secondary path leading to the portion of the gas path upstream of the bleed air aperture relative to flow along the gas path, further comprising a baffle partitioning a subchamber of a low pressure entry point from the associated secondary path, said subchamber being adjacent the second one of the at least two bearing seals and in fluid flow communication with the deviation path, said baffle being operational upon flow reversal across the second one of the at least two bearing seals to guide fluid coming into the subchamber from the second one of the at least two bearing seals to the deviation path, and away from the secondary path.

14. The gas turbine engine of claim 11 wherein the first entry point is in fluid flow communication with the associated secondary path via a secondary seal.

15. The gas turbine engine of claim 11 wherein the gas turbine engine has two shafts, and the deviation path extends at least partially along an intershaft spacing provided between the two shafts.

16. The gas turbine engine of claim 11, wherein the buffer air supply has a connecting air path extending from the first entry point to the second entry point.

17. The gas turbine engine of claim 16 further comprising a flow restrictor formed in the connecting air path, the flow restrictor throttling the flow rate of buffer air to the second entry point, thereby establishing the higher relative pressure at the first entry point.

18. The gas turbine engine of claim 16, wherein the buffer air supply includes struts extending across the gas path being closed except for an inlet at an outer end and an outlet at an inner end, the struts being used as ducts for channeling buffer air across the gas path during which the buffer air can lose heat to the gas path.

19. The gas turbine engine of claim 18 wherein the outlets of two or more struts are interconnected by a plenum.

* * * * *